Jan. 14, 1958    G. C. F. BECK    2,819,529
ADJUSTABLE HEIGHT GAUGE AND JACK
Filed April 6, 1954
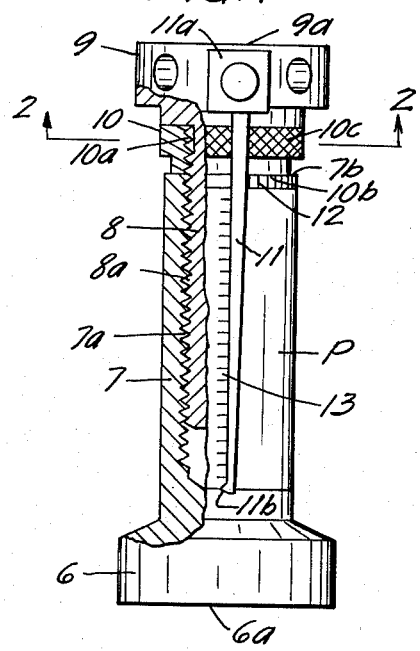
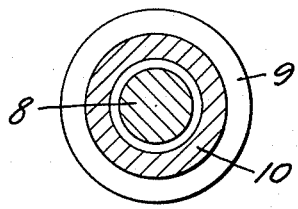
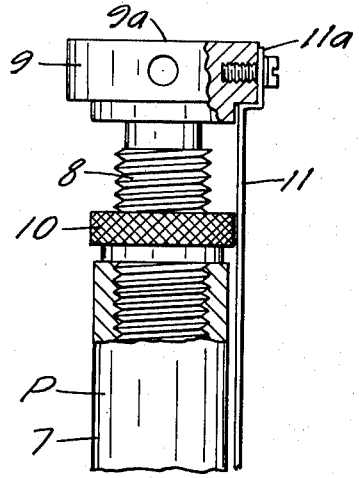
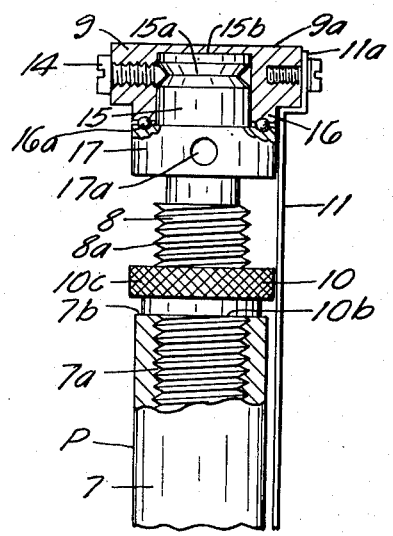
INVENTOR
GUSTAF C. F. BECK
BY
Williamson, Williamson, Schroeder & Adams
ATTORNEYS United States Patent Office 2,819,529
Patented Jan. 14, 1958

2,819,529
ADJUSTABLE HEIGHT GAUGE AND JACK
Gustaf C. F. Beck, Minneapolis, Minn.
Application April 6, 1954, Serial No. 421,293
5 Claims. (Cl. 33—164)

This invention relates to threadedly and longitudinally adjustable jack mechanisms comprising usually a screw threaded, upstanding base or pedestal member and a stem or head-carrying member having threaded connection with the first member for proving, through applied torque, a powerful lifting movement as well as a longitudinally adjustable instrumentality for accurately measuring or indicating a variety of slightly different heights within a predetermined range. Such structures in the prior art, generally speaking, have been used for hoisting or lifting operations and in some instances, on smaller scale, have been employed with set screw means or the like as adjustable gauges to facilitate height or length determination of manufactured articles.

It is an object of my invention to provide a comparatively simple but highly efficient jack mechanism, the inherent construction of which is well adapted for a hoisting jack while nevertheless providing a finely adjustable gauge for determining with precision, the height or length of manufactured articles subjected to inspection.

A further object is the provision in simplified jack form, of a highly efficient, threadedly adjustable gauge for set determination of precision heights to facilitate inspection of manufactured articles, tools, dies and the like, wherein accurate readings for height adjustments through fractional turning of a stem member upon a screw threaded pedestal as well as displacements and/or revolutions may be quickly obtained through certain novel graduations and combinative indicator of my improved construction.

Another object is the provision in structure of the class described of a lock medium combined with the threaded interconnection of pedestal and longitudinally adjustable stem whereby the stem may be locked for either support or height-determining function at an infinite number of threadedly adjusted positions to determine height or to support a heavy member in elevated position.

Still another object is the provision in structure of the class described, of a head member rotatably connected with the upper end of the adjustable stem in such manner as to afford maximum bearing support therefrom as well as a lock relation thereto.

These and other objects and advantages of my invention will more fully appear from the following description made in connection with the accompanying drawings wherein like reference characters refer to similar parts throughout the several views and in which:

Fig. 1 is a view showing an embodiment of my invention adapted for use both as an adjustable gauge and hoisting jack mostly in side elevation but with a longitudinal portion being broken away, showing some of the working parts in cross section;

Fig. 2 is a cross section taken on the line 2—2 of Fig. 1;

Fig. 3 is a view in longitudinal or vertical cross section showing one form of the adjustable stem of my construction in full with a swiveled but nevertheless lockable head applied thereto; and Fig. 4 is a view similar to Fig. 3 but showing another form of jack stem having an integrally formed head affixed thereto.

Referring now to both forms of the invention illustrated, I provide a vertical pedestal P having as shown, a circular, integrally formed base 6 provided with a planar support surface 6a and having an integral, upstanding sleeve 7, as shown internally threaded along the greater portion of its length 7a and terminating at its upper end in a planar, annular abutment surface 7b. An elongated screw stem 8 having external threads 8a throughout substantially its length and of similar screw pitch to the threads 7a, is threadedly engaged within the sleeve 7 and carries at its upper end a somewhat enlarged head 9 of cylindrical shape, having a horizontal upper surface 9a.

The short, annular lock nut 10 having internal threads 10a of similar pitch to the threads 7a and 8a, is interposed between the upper end of stem 8 and the upper end and abutment surface 7b of the pedestal sleeve. Lock nut 10 terminates at its lower end in a reduced portion having a horizontal, planar jamming surface 10b which is adapted to be forced against the end 7b of the sleeve. The lock nut 10 preferably has its upper portion provided with circumferentially spaced, deep notches or knurling 10c (see Fig. 3) to facilitate turning and jamming thereof, for locking function.

In the forms of the invention illustrated, head 9 is provided with a rigidly attached, depending, two-function indicator or pointer 11, being offset and angled at its upper end 11a as shown in Fig. 3, for rigid and precise attachment to the periphery of head 9 and having its body as shown, disposed in predetermined longitudinal relation and in slight working clearance from the periphery of pedestal sleeve 7. The right hand edge (as viewed in Fig. 1) of indicator 11 adjacent at least its upper portion, is straight and parallel to the axis of stem 8 to cooperate for determining fractional turnings of the stem relative to the pedestal with a multiplicity of calibrated, circumferentially spaced graduations 12 formed upon the upper marginal portion of the pedestal sleeve. These graduations may be calibrated to represent thousandths of an inch in the displacement or adjustment of stem 8 through various degrees of threaded turning relative to pedestal 7.

The lower end of pointer or indicator 11 may be utilized or may be formed into a sharp lateral V 11b to cooperate with one or more series of longitudinally spaced graduations 13 calibrated and at intervals, preferably numbered to indicate relative revolutions of the stem 8 upon pedestal P from a predetermined starting position. In this connection, the starting position or lowermost position of head 9 is important and to this end, suitable annular abutment surfaces of planar form are provided at the bottom end of head 9, the upper end of lock nut 10 and as previously recited, at 7b on the upper end of sleeve 7.

In Fig. 1, my adjustable gauge is shown in maximum, compacted or shortened position with the various abutment surfaces previously described in engagement and with the lower end of indicator 11 designating zero and with the pointer 11 longitudinally positioned over the longitudinally spaced graduations 13.

In Fig. 3, the device is shown adjusted with the stem 8 extended considerably after several revolutions have been imparted by torque thereto. The lock nut 10 in Fig. 3 has been manually screwed downwardly in clockwise direction to jam the under horizontal surface thereof against the planar upper end 7b of the stem. The head 9 of course, when the device is used as a gauge, must be rigidly affixed upon the upper end of the stem as by a set screw 14 with of course the indicator 11 first being properly adjusted in alignment with the graduations 13 when the device is shortened to the maximum extent.

When a predetermined setting is desired, the head 9 and with the stem 8, is turned through the predetermined revolutions, revolution or partial revolution, as determined by the two sets of graduations 12 and 13, to give the precise inspection height desired. Thus, if the longitudinally spaced graduations 13 representing each one revolution of the stem indicate 1/10 of an inch and the circumferentially spaced graduations 12 indicate 1/1000 of an inch, to set the guage for 705/1000 of an inch, the stem is revolved seven times as determined by the cooperative relation of pointer 11 and longitudinal graduations 13 and thereafter, is turned through five of the circumferentially spaced graduations 12, resulting in precisely the overall length desired, to wit, 705/1000 of an inch. At such point, the lock 10 is manually screwed clockwise to jam its lower horizontal surface against the upper end of the sleeve, thereby positively retaining the desired length upon the guage.

The gauge may be then used in the various well known manners as a measurement block or precision inspection gauge to position slide blocks of indicators, die-making tools and the like.

Similarly, if a reading or determination of an unknown height is desired, the gauge on the same horizontal support surface may be adjusted to cause the head 9 to engage the surface whose height is to be measured and thereafter, the reading taken off of the two sets of graduations to determine precise height. Thereafter, if a predetermined working clearance is desired, the stem 8 may be turned to the fraction of a revolution of revolution and proper fraction desired as may be determined from the cooperation of the indicator or pointer 11 with the two sets of graduations described.

In smaller or larger sizes, my structure, particularly that illustrated in Figs. 1 to 3 without use of the graduations and indicator 11, is particularly well adapted for hoisting or clamping jacks. A head 9 swivelly attached to the stem such as shown in Fig. 3, is then of particular advantage in that it enables the stem 8 to be raised or lowered without applying turning friction to the member lifted or engaged.

In the form of the swiveled head 9 shown in Fig. 3, the upper end of the stem 8 is provided as shown, with a medially and peripherally V-grooved, head-retaining collar 15, the groove 15a being adapted to accommodate the head-locking set screw 14 which threadedly engages and is received in a threaded radial socket of head 9. Head 9 is concentrically bored and machined to nicely fit the upper and lower circular flange portions of collar 15 and further, is provided with an inner planar bearing surface for engagement against the upper extremity 15b of collar 15.

Head 9 is further provided with a depending short bearing skirt 16 for engaging in ball bearing contact 16a the horizontal annular shoulder of an enlargement collar 17 affixed or integrally formed with stem 8 just below collar 15. Thus, maximum bearing surface is provided between the head 9 and stem 8 when locking connection of the head and stem is released.

In using my structure as a jack, torque is of course applied in counterclockwise direction for lifting through a suitable wrench or tool which may interfit at its inner end, suitable notches or apertures 17a in the enlargement 17. During such lifting action with the head 9 released there will be no turning friction applied to the supported article. When the jack is elevated the desired distance, lock nut 10 may be manually turned to set the same, causing jamming of the lower end of the nut against the upper extremity 7b of the pedestal sleeve.

From the foregoing description it will be seen that I have provided an adjustable height gauge capable of micrometer adjustments and very accurate calibrated reading for determining and engaging precise heights or lengths desired.

It will further be seen that the device is equally capable of use as a jack for a wide variety of uses in lifting and leveling various pieces of machinery and the like. In leveling or jack operations, the combination of the close cooperating parts of my device make possible very effective, accurate and calibrated variance in heights readily determinable from the readings obtained through the cooperation of the indicator arm and two or more sets of graduations 12 and 13.

It will of course be understood that various changes may be made in the form, details, arrangement and proportions of the parts without departing from the scope of my invention.

What I claim is:

1. A combination adjustable gauge and lifting jack comprising, a vertical pedestal having a horizontal base and an upstanding sleeve portion open at its upper end and internally threaded throughout a substantial portion of its length, a stem for longitudinal adjustment in said pedestal having an external thread for engagement with the thread of said sleeve and provided with means adjacent its upper end for application of torque thereto, a short lock nut internally threaded upon said stem and having a horizontal jamming surface for engagement with the upper end of said sleeve, said stem having an annular collar at the upper end thereof defining in conjunction with the immediately lower portion of said stem, a horizontal, annular thrust bearing flange and said stem terminating in a substantially horizontal thrust bearing end and a head rotatively mounted upon said collar and having an under bearing surface in contact with the terminal thrust bearing surface of said stem and having also a depending, annular bearing surface in contact with said annular flange about said collar and means for retaining said head against longitudinal displacement from said collar.

2. A combination, adjustable gauge and jack comprising a vertical pedestal member having a horizontal base and provided with a longitudinal screw thread, an elongated, vertical stem member having a longitudinal screw thread for engaging said first mentioned thread to provide relative longitudinal adjustment, a lock nut threadedly engaging one of said threads and having a horizontal jamming surface for engagement with an edge of one of said members, a head connected with the upper end of said stem and having a horizontal planar upper surface, an indicating pointer rigidly affixed to said head and depending vertically from the periphery thereof in close spaced relation to the periphery of said pedestal, a calibrated scale comprising circumferentially spaced graduations formed on the periphery of said pedestal to indicate degrees of turning of said stem relative to said pedestal in combination with a longitudinal edge of said indicating pointer and a second scale consisting in a series of graduations spaced longitudinally upon the periphery of said pedestal to indicate in combination with the lower terminal of said indicating pointer the number of revolutions of said stem relative to a starting position of said stem upon said pedestal.

3. A combination adjustable gauge and lifting jack comprising, a vertical pedestal having a horizontal base with a downwardly facing supporting surface and an upstanding sleeve portion open at its upper end and internally threaded throughout a substantial portion of its length, said horizontal base being adapted to stand freely on a horizontal surface with the center of gravity lying in a vertical line within the periphery of the base, a stem for vertical adjustment disposed in said pedestal and having an external thread for engagement with the thread of said sleeve and provided with means adjacent its upper end for application of torque thereto, a short lock nut internally threaded upon said stem and having a horizontal jamming surface for engagement with the upper end of said sleeve, an enlarged head at the upper end of said stem rotatably mounted with respect to said sleeve and having an upwardly facing plane surface in spaced parallel alignment with the downwardly facing supporting surface of said horizontal base, said gauge and lifting jack being adapted for upright positioning upon a horizontal supporting surface for sliding beneath an upwardly spaced horizontal supported surface for bearing engagement between said respective supporting and supported surfaces.

4. A combination adjustable gauge and lifting jack comprising, a vertical pedestal having a horizontal base with a downwardly facing supporting surface and an upstanding sleeve portion open at its upper end and internally threaded throughout a substantial portion of its length, said horizontal base being adapted to stand freely on a horizontal surface with the center of gravity lying in a vertical line within the periphery of the base, a stem for vertical adjustment disposed in said pedestal and having an external thread for engagement with the thread of said sleeve and provided with means adjacent its upper end for application of torque thereto, a short lock nut internally threaded upon said stem and having a horizontal jamming surface for engagement with the upper end of said sleeve, an enlarged collar secured to the upper end of said stem and having an upwardly facing ball bearing race, and a head having a downwardly facing surface with a ball bearing race in opposed relation with that of the enlarged collar and further having depending abutting means for engagement with the enlarged collar to prevent endwise displacement of the head, said head having an upwardly facing horizontal bearing surface in spaced parallel alignment with the downwardly facing bearing surface of the base whereby said gauge and jack device may be positioned and extended into bearing engagement between the horizontal surfaces of spaced articles.

5. A combination adjustable gauge and jack comprising, a vertical pedestal member having a horizontal base and provided with a longitudinal screw thread, an elongated vertical stem member having a longitudinal screw thread for engaging said first mentioned thread to provide relative longitudinal adjustment, a lock nut threadably engaging one of said threads and having a horizontal jamming surface for engagement with a shoulder on one of said members, a head connected with the upper end of said stem and having a horizontal planar upper bearing surface, a depending indicating pointer rigidly secured to said head and extending outwardly of the pedestal in clearance with said lock nut and with the outer periphery of said pedestal and terminating medially of the ends thereof, a calibrated scale circumferentially spaced about the periphery of said pedestal to indicate degrees of turning of said stem relative to said pedestal in combination with a longitudinal edge of the indicating pointer, and a second scale also formed on the periphery of said pedestal laterally to the circumferential first mentioned scale whereby to indicate the number of revolutions of said stem relative to a starting position of said stem and the depending end of said indicating pointer with respect to the sleeve and the second scale.

References Cited in the file of this patent

UNITED STATES PATENTS

| 964,824 | Tidd | July 19, 1910 |
| 2,247,797 | Anderson | July 1, 1941 |
| 2,349,159 | Freeman | May 16, 1944 |
| 2,350,881 | Dickerman | June 6, 1944 |
| 2,426,933 | Jarosz | Sept. 2, 1947 |